May 29, 1934.　　　　W. A. GILCHRIST　　　　1,960,904
SETTLER
Filed March 26, 1932　　　4 Sheets-Sheet 1

Fig. 1.

Fig. 2.

Inventor
William A. Gilchrist, Deceased
Emily F. Gilchrist, Executrix.
By Wilson, Dowell, McCanna & Rehm
Att'ys

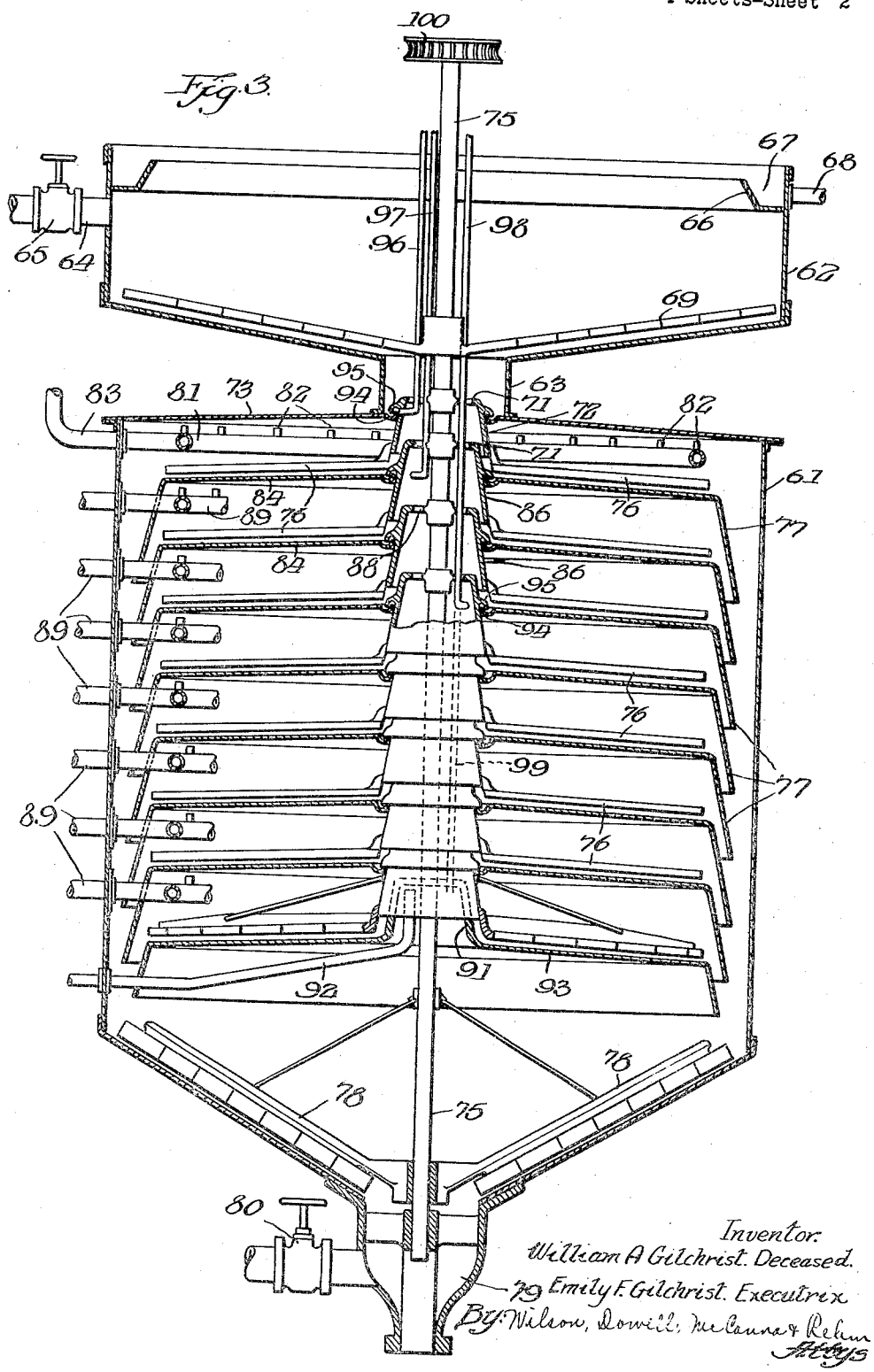

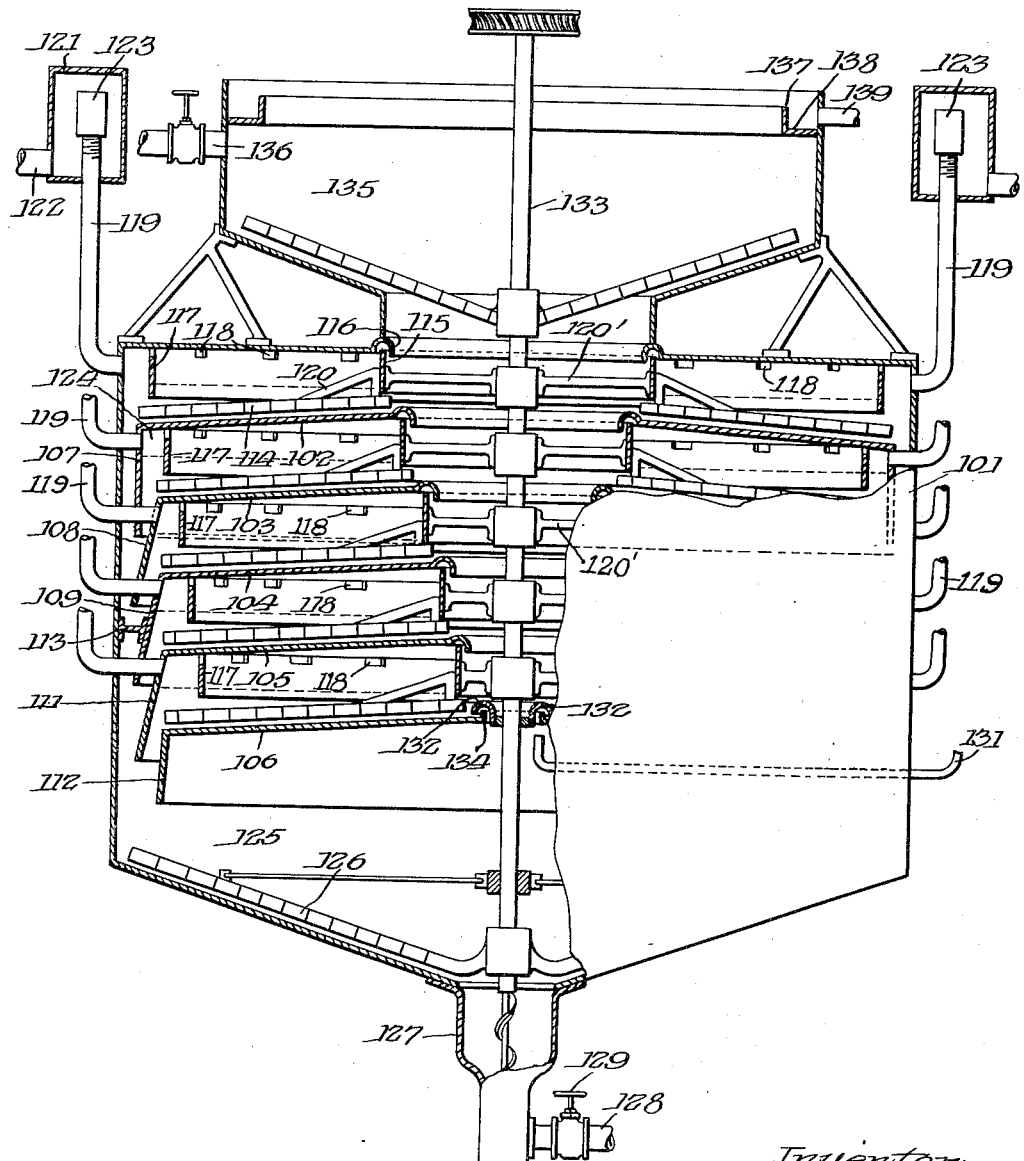

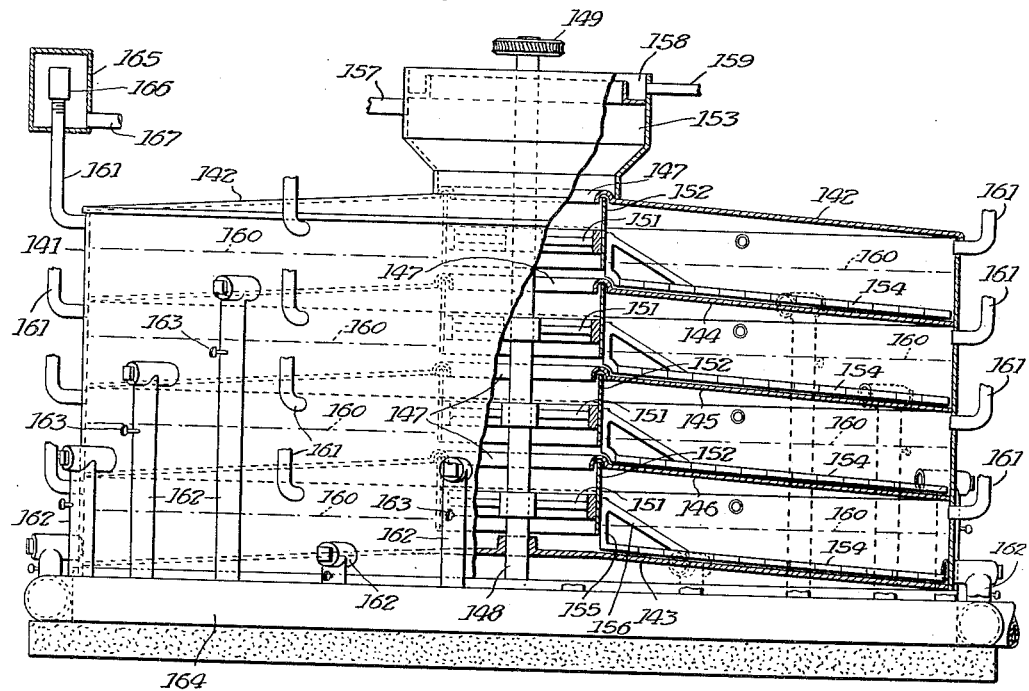

Patented May 29, 1934

1,960,904

UNITED STATES PATENT OFFICE 1,960,904

SETTLER

William A. Gilchrist, deceased, late of Chicago, Ill., by Emily F. Gilchrist, executrix, Chicago, Ill.

Application March 26, 1932, Serial No. 601,338

12 Claims. (Cl. 210—55)

This invention relates to methods and apparatus for clarification of liquids contaminated with or containing settleable sediment suspended therein, and particularly to the art of clarifying liquids in continuous treatment processes wherein the settled sediment and clarified liquid are being continuously removed from the apparatus while unclarified liquid is being continuously introduced.

The invention finds commercial application both in the recovery of sedimentary substances and in the recovery of clarified liquids, and particularly in the treatment of waste liquors in various industries. It is especially useful in the treatment of sewage for the efficient removal of solids therefrom, and also is excellently adapted for removal of coagulable colloidal substances found in sugar cane juices.

The invention aims in general to provide improved methods and apparatus for the continuous clarification of sediment-bearing liquids. Specific advantages and objects of the invention should become apparent upon a perusal of the specification and the drawings forming a part hereof.

In the drawings

Fig. 1 is a central vertical section of a cylindrical settler showing one form of the invention, Fig. 2 is a detail of one form of the gas trap shown in Fig. 1, Fig. 3 is a vertical central section of another form of settler, Fig. 4 is a central vertical sectional view of another form of settler, and Fig. 5 shows partly in elevation and partly in central vertical section a modified form of settler.

Fig. 1 shows a settler having a cylindrical tank 1 provided with a conical bottom 2 and a top 3. A feed box supplying unclarified liquid to the settler is provided in the form of a box generally indicated as 4 mounted on top of the settler having an inclined bottom wall 5 and a large bottom aperture 6 which communicates with the interior of the settler tank. The unclarified liquid is introduced into the feed box through a pipe 7 under control of a valve 8 or some other suitable or equivalent flow control means, and should scum accumulate within the feed box it is permitted to escape over the top of an overflow rim 9 into an annular scum channel 11 from which it may then escape to the scum outlet pipe 12. Where scums are liable to form on the liquid being treated the level of the liquid will be so regulated as to cause the scums only to escape over the top of this rim.

The tank 1 is divided by means of the trays 13, 14, 15, 16 and 17 into a plurality of relatively shallow superimposed settling compartments. Each tray except the bottom tray has a central aperture for permitting the flow of liquid downwardly therethrough. The tray 13 has a depending flange or apron 18 spaced inwardly somewhat from the vertical walls of the tank 1 to permit the discharge of settled sediment thereover and to guide it downwardly past the level of the underlying tray. The tray 14 is provided with an annular apron 19 which is spaced inwardly even further from the walls of the tank 1 to permit the discharge of settled sediment from tray 14 past the lower edge of the apron 18. The trays 15, 16 and 17 are provided with similar aprons 21, 22 and 23, the aprons being vertical in order to prevent the accumulation of settled sediment thereon and being successively offset to provide an outer channel of progressively increasing capacity.

The feed aperture in the top of the tank is surrounded by a grooved member 24 which co-operates with the upper edge of an annular collar 25 to form a trap for regulating the escape of gases from the topmost settling compartment. The collar 25 moves relatively to the stationary member 24 and rotates simultaneously with the sweep arms 26, a rigidly braced structure being formed by means of the brace 20 extending from the shaft 27 through the feed collar to the middle portion of the sweep arm, whereas the sweep arm itself is more directly supported on the shaft 27, that is, upon the sleeve 27'. By bracing and supporting the sweep arm through the rotating collar the sweeps can be adequately supported even when the settler has as great as a one hundred foot diameter. The number of sweep arms employed in each compartment and rotated by the shaft 27 is a matter of choice. Each sweep arm is preferably provided with a plurality of scraper blades 26' of well known construction moving slightly above the surface of the tray spaced slightly apart from each other.

The blades are disposed at an angle to urge gradually the settled sediment radially outwardly toward the peripheries of the trays to fall over the peripheral edges thereof into the annular channel provided for the downward movement of the sediment.

The feed aperture through the tray 13 restricted by the grooved member 23 is smaller than the aperture in the top of the tank, thus enabling the central portion of the tray 13 to extend somewhat into the space below the feed collar 25 assuring that a portion of vertically falling heavy solids contained in the incoming stream of unclarified liquid will strike the inner edge of the tray 13 and be diverted into the top compartment. Each of the succeeding trays extends in a similar manner into the space below the column of liquid confined by the next above feed collar so that each compartment may thus receive a proper proportion of those heavy solids which are falling vertically and might not otherwise be diverted into any compartment except the bottom compartment. In this manner substantially equal proportions of both the heavy and light sediments may be diverted into each settling compartment along with the liquid so that the settling and filtering conditions in all of the compartments may be substantially alike. The grooved member 28 cooperates with a rotating feed collar 29 in the second compartment from the top to regulate the escape of gas from the second compartment.

The next compartment which lies below the tray 14 is fed through the central feed passage defined by the grooved member 31 and the annular rotating feed collar 32.

In the three top compartments the gas traps operate as follows: In each instance the grooved member which extends entirely around the central feed aperture has its inner edge extending downwardly somewhat below the adjacent ceiling of the associated compartment. Within this groove the rotating feed collar extends upwardly providing a passage in which gas may accumulate. The bottom level of the accumulated gas in each compartment will extend down approximately to the level of the edge of the grooved member, thus being somewhat below the entrance to the gas passage, thus preventing any scum which may be floating on the surface of the liquid in the associated compartment from entering the gas passage. However, the gas which may accumulate in the compartment as a result of decomposition and fermentation or from any other cause will naturally seek the highest level in each compartment, and since each tray is slightly inclined as shown the gas will tend to flow toward the center of the compartment along the ceiling and may escape through the gas trap therein provided.

The apparatus for discharging gas from the fourth compartment from the top, Fig. 1, consists of a feed collar 33 which is supported on the rotating sweep arms and the upper end or flange of which is curved upwardly and thence downwardly so that its edge protrudes into an upwardly facing grooved member 34, the latter being mounted on the tray 15. The gas which accumulates in the fourth compartment will then rise on the outside of the collar 33 then pass downwardly through the grooved member 34 and out into the liquid lying thereabove. A substantial pocket of gas may thus be trapped under the curved flange on the feed collar 33. Should any scums tend to collect between the collar 33 and the edge of the tray 15 the rotation of the feed collar relative to the tray will constantly keep the scums so broken up that they cannot prevent gas from passing upwardly.

The compartment formed between the trays 16 and 17 is provided with a somewhat different gas trap. The collar 35 is quite similar to the collar 33 except in one portion where a special gas trap is provided. A grooved member 36 mounted on the tray 16 is provided similar to the grooved member 34 but it may in this instance be deeper and somewhat larger to encourage the formation of a mud seal in the groove wherein the edge of the curved flange on the collar 35 moves. Such a mud seal would serve to prevent the flow of liquid or gas through the groove and would assist in accumulating a deeper layer of gas in the compartment below the tray 16 extending down as low as the edge 37 in the gas trap shown in detail in Fig. 2. The trap is provided with side walls 38 and 39 and a roof 40. Within the confines of the gas trap a part 41 of the collar 35 serves as a baffle, the upper edge 42 of which terminates in approximately the position shown in Fig. 2 and assists in trapping a pocket of gas within the trap extending down as low as the edge 37 of the roof 40 and serving to prevent scums floating on the liquid in the adjoining compartment from entering this gas trap. While the entire trap rotates with the feed collar it will always be in position to discharge any excessive accumulations of gas in the adjoining compartment.

The lowermost compartment below the tray 17 is provided with a somewhat different gas trap. The baffle consists of an upwardly extending rim provided on the tray 17 while the downwardly facing grooved member for forming the gas passage consists of the member 44 mounted upon the shaft 27 for rotation therewith and constructed as shown for trapping a pocket of gas on both sides of the rim 43 and for discharging it upwardly into the space above the tray 17. The rotation of the grooved member 44 relative to the rim 43 will serve to break up any scums or other floating substances which may accumulate at the entrance of this annular gas passage and which might otherwise prevent the escape of the gas.

The clarified effluent is drawn off from the various settling compartments through a multiplicity of draw-off tubes such as the tubes 45 and 46, any number of which may be connected with each compartment, there usually being at least six or eight to each compartment and more where the diameter of the compartments requires more tubes to procure substantially radial movement of the clarifying liquids. Each of these tubes is to be inclined at an angle greater than 45° so that any fine particles of sediment which may settle on the inside of the tubes will tend to slide downwardly back into the settling compartments and thus be prevented from clogging the tubes.

Since the settled sediments are moved by the sweeps radially in each compartment, except in the bottom compartment, toward the peripheries thereof and discharged downwardly over the peripheral aprons the draw-off tubes likewise in those compartments are located at the peripheries of the compartments thus causing an outward radial movement of both the clarifying liquid and the settled sediments.

However, the bottom compartment which receives the sediment from all the compartments disposed thereabove is provided with sweep arms 47 whose scraper blades 48 are positioned to push the mud toward the center of the bottom compartment to the discharge well 49.

In order to promote parallel movement of the sediment and liquid in the bottom compartment and in the same direction the liquid draw-off for the bottom compartment is placed at the center thereof, the pipe 51 having an inlet port 52 provided for that purpose. A riser 53 is connected with the pipe 51 to carry the clear liquid upwardly to a point of discharge. Each of the clear effluent draw-off pipes is preferably connected by a riser to some suitable and well known apparatus for regulating the discharge from each of these draw-off pipes to provide a regulated flow of liquid through each compartment. An example of means for regulating the hydrostatic head in each compartment is shown in Fig. 1, a collar 54 being threaded on the draw-off pipe 45, being capable of being screwed up or down to regulate thereby the discharge of liquid from the associated compartment, the liquid being discharged into a trough 55.

The settler shown in Fig. 1 operates as follows. The liquid to be clarified is admitted through the pipe 7 into the feed box 4 and flows downwardly through the central feed channel into each compartment underneath the respectively associated rotating feed collars such as 25, 29, 32, 33 and 35. The sediment settling on each tray is swept gradually to and over the periphery thereof and falls to the bottom compartment. Its discharge from the well 49 is so restricted by the valve 56 as to maintain constantly a deep layer of sediment in the bottom compartment and a layer of sediment upon each tray extending higher at least than the bottom of the respectively associated rotating feed collars. In this manner the liquid entering each compartment must enter the associated sediment layer beneath the top thereof and must filter more or less horizontally and slightly upwardly therethrough as the incoming sediment tends to agglomerate therein and the released liquid tends to flow toward the clear liquid outlets. The sweeps will be rotated slowly to avoid undue agitation in each compartment and to urge the sediment gradually toward the peripheries of the upper trays and in the bottom compartment centrally toward the discharge well. In the bottom compartment no untreated liquor is introduced, but a considerable quantity of liquid will be expressed from the accumulated sediment as the latter consolidates in the bottom compartment, rising upwardly to the top of the compartment. This will be a good quality of clear effluent which may be drawn off along with the effluent from the other compartments. Such gas as may form in any of the compartments will escape as in the manner above described without agitating the liquid in the compartments, and clogging of the gas traps will be prevented.

Fig. 3 shows a modified form of settler having a tank generally indicated as 61 and a feed box 62 connected to the top of the tank by a short channel 63. The liquid to be clarified is introduced through a pipe 64 under control of a valve 65 into the feed box, and scums, if any, are permitted to rise and overflow the rim 66 into the gutter 67 and escape through a scum draw-off pipe 68. The feed box is provided with sweep arms 69, having the usual sweep blades, not shown, for pushing sediment collecting in the box into the channel 63.

As the unclarified liquid containing the sediment flows through the channel 63 it then enters through a plurality of ports 71 which are provided in the ball-shaped rotatable feed distributor 72, all of the liquid for feeding all of the compartments being passed through these ports 71. Part of the liquid then flows beneath the skirt of the distributor 72 into the uppermost compartment formed between the top 73 of the tank and the tray 74.

The feed distributor 72 is mounted upon a shaft 75 for continuous rotation therewith and sweep arms 76 are secured to the distributor and hence rotate with the shaft. The sweep arms carry a plurality of blades such as are shown in the Graham et al Patent No. 1,602,014, issued October 5, 1926, and function in the same manner, that is, to push the sediment radially outwardly to discharge it over the peripheral apron 77. The mud discharged over this apron falls downwardly through the peripheral channel outside of the aprons of the various trays and when it reaches the bottom compartment it is carried by the sweeps 78 to the center of the settler into a discharge well 79. The outflow of sediment from the well may be regulated by a valve 80 or by any other suitable mechanism. The depth of the layer of sediment maintained on each tray in each settling compartment will be sufficient so that its top surface will extend above the bottom of the skirt of the associated feed distributor, so that unclear liquid fed into the compartment underneath the distributor will enter the sediment layer beneath the top thereof and flow radially outwardly more or les horizontal but somewhat upwardly. Thus sediment in the liquid will become agglomerated with the sediment already in the layer and the clarified liquid rising up from the sediment layer will enter the circular clear liquid draw-off pipes, such as pipe 81 in the top compartment through the ports 82, and will be carried out through the pipe 83. Any suitable means may be provided for regulating the discharge of clear effluent from the pipe 83, such as a riser and adjustable weir, as is commonly used in this art, or the regulation may be accomplished by some equivalent apparatus.

The next compartment which is formed between the tray 74 and the tray 84 is fed with unclarified liquid through the annular space between the bottom of the bell-shaped feed distributor 85 and the top of the distributor 86, these last two distributors being alike and quite similar to the distributor 72, each being provided with a plurality of ports 87 and 88 for permitting the flow of the unclarified liquid downwardly to the various compartments. The remaining compartments except the bottom compartment, are duplicates of the last described compartment, each compartment being provided with the customary sweep for discharging the sediment radially outwardly over its discharge apron and each being provided with a clear liquid draw-off pipe such as the pipe 81 or the pipe 89.

The bottom compartment does not receive any raw unclarified liquid but on account of the compression which the sludge is under in the bottom compartment some free liquid may be expected to accumulate and an inverted well 91 is provided particularly for locating the end of the draw-off pipe 92 in a zone of clarified liquid. The inverted well 91 is stationary and is attached to the tray 93.

Should any gas accumulate or form in any of the compartments it will rise around the annular traps outside of the feed distributors which are formed by the upwardly curved flanges 94 integral with the several trays and the downwardly curved flanges 95 formed integrally with the feed distributors. The gas will then be taken off through the pipes 96, 97, 98, and through other similarly disposed pipes not shown. The bottom of each upwardly facing grooved member 94 will eventually become filled with sediment and will form a seal in connection with the rotating flanges 95 to prevent the flow of liquid therethrough. Gas will be removed from well 91 by pipe 99.

Any suitable mechanism may be employed for rotating the central shaft 75, such for example as the worm wheel 100 on top of the shaft and any suitable driving means connected therewith.

Another form of settler shown in Fig. 4 consists of a main tank 101 provided with a plurality of trays 102, 103, 104, 105 and 106, the total number of trays being subject to considerable variation. Each tray is provided with a peripheral depending apron, such as the aprons 107, 108, 109, 111, and 112. These trays may be supported in any suitable manner, as for example, by brackets, one of which 113, is shown affixed to the apron 109, but to simplify the drawings no other brackets are shown, it being understood that supporting brackets of this character may be applied to all of the aprons in as great a number as is deemed necessary. Above each tray is a rotating sweep 114 of the usual construction commonly used in multiple tray settlers of this type. The inclined blades on the sweep arms are not herein shown but may be preferably of the character disclosed in the United States Letters Patent 1,602,014 issued to Graham, et al and serve to push the sediment along the trays.

The liquid to be clarified is introduced into all of the compartments, with the exception of the bottom compartment, through central apertures, passing into each compartment underneath a rotating feed collar 115. The top of each of these feed collars extends upwardly into an inverted grooved member 116, to form a gas trap. Thus, gases which may accumulate in any compartment may find their way into the trap and thence escape under the inner lip of the grooved member, thence upwardly into the central feed channel. The brackets 120 and 120' connect the sweep arms and collars rigidly to the central shaft.

The settling compartment above each tray is confined between the associated rotating feed collar and an annular shield 117 which in each case is sealed to and depends from the ceiling of the settling compartment. At spaced intervals near its top the shield is provided with apertures 118 for permitting the clarified liquid to flow outwardly from the settling compartment into the annular effluent channel which is formed between each shield and the skirt of the tray lying above each shield, or between the shield and the outer wall of the tank as in the case of the top compartment. It is preferred that each shield depend low enough so that it will extend downwardly a short distance into the layer of sediment normally being maintained on the top of each tray. Thus it will dip into the lighter sediment on the top of the layer and tend to restrain the lighter or insufficiently compacted sediment from falling over the edge of the tray, but will permit the heavier or more concentrated sediment to be pushed thereunder off the edge of the tray.

Sediment on the trays is moved by the sweeps to the peripheral edge of each tray and falls therefrom into the annular sediment channel formed between the outer wall of the tank and the successive depending skirts 107, 108, 109, 111, and 112. The feed collars likewise extend downwardly close enough to the top of each tray so that they extend into the sediment layer thereon, thus causing the incoming unclarified liquid to first pass into the sediment layer and thence to flow somewhat horizontally and upwardly through each sediment layer, thereby producing a filtering action on the liquid. The previously accumulated sediment will act as a filtering medium for the unclarified liquid, hence as the liquid escapes upwardly through the top of the sediment layer in each zone it should be very substantially clarified and in the course of its movement toward the outlets 118 in the shields it should deposit the rest of its sediment. The rate of flow in each compartment can be regulated to maintain the highest velocity consistent with complete elimination of the sediment.

The clarified liquid which flows into the channels formed between the shields and skirts will then be drawn off through the clear liquid draw-off pipes 119. Since the clear liquid channel extends entirely around the tank outside of each settling zone only a few draw-off pipes per settling compartment will be needed. The pipes 119 rise to a clear liquid discharge trough 121 which has an outlet 122. It should be understood that the clear liquid is drawn off from each compartment separately from the other compartments, hence by raising or lowering the wiers 123, which are threaded onto the tops of these pipes, the rate of liquid discharge from each compartment may be individually regulated.

Should the operator discover that any one compartment is discharging an effluent insufficiently clarified, as is observable by the liquid flowing over the top of the associated wiers, he can immediately raise the wier, reducing the rate of discharge and whatever sediment has passed through the openings 118 and still remains within the effluent channels between the skirts and shields will be permitted to settle out, falling directly into the annular sediment discharge channels. Thus if there should be a temporary excessive discharge of sediment along with the supposedly clarified liquid from any settling zone, this sediment will not clog up the clear effluent draw off apparatus, as was very likely to occur in prior multiple tray settlers which employed clear liquid draw-off pipes which extended into the tanks and thence annularly within the settling compartments. Any sediment which may accidentally escape through an outlet 118 into the annular effluent channel, such as the effluent channel 124, will settle and fall into the sediment discharge channel.

The sediment falling down through the annular sediment channel accumulates in the bottom compartment 125 and is conveyed by the sweep arm 126 to a sediment well 127 from which it may be exhausted through a pipe 128 under control of the valve 129. In ordinary practice some clear liquid will be expressed from the sediment in the bottom compartment as the sediment continues to consolidate, and this clear liquid may be drawn off from the bottom compartment through a pipe 131. Should any gas accumulate in the bottom compartment it may escape upwardly into the feed channel through a trap formed by the downwardly facing grooved member 132 which rotates with and is carried on the shaft 133, cooperating with an upwardly extending flange 134 which is a part of the bottom tray 106.

In each of the compartments herein shown the gas trap consists of two cooperating members, one of which rotates. Should any scum tend to accumulate in the vicinity of the gas traps it would be broken up and kept in agitation, permitting the gas to escape therethrough. Consequently, none of these gas traps may be accidentally clogged. The lip of each gas trap is low enough to hold liquid level lower than the entrance to the trap, to keep scum from entering the trap.

The feed box 135 mounted on top of the settler is of the usual construction, consisting of the inlet pipe 136, a scum collar 137, and scum channel 138, and an outlet 139 for the scum. By regulating the wiers 123 the liquid level in the feed box can be maintained high enough to permit scum to flow over into the scum launder.

The settler shown in Fig. 4 operates as follows:

The liquid to be clarified is introduced through the pipe 136 to the feed box and then flows downwardly through the central feed channel passing under each of the feed collars 115 into each of the associated settling compartments. Because of the offset arrangement of the feed collars and trays lying thereunder about equal proportions of heavy sediments which fall vertically will be diverted into each of the compartments, to thus promote substantially the same settling conditions in all of the compartments. As the liquid enters each settling zone it passes through the sediment layer already accumulated therein from previous operation of the settler, filters therethrough radially outwardly and upwardly, the clarified effluent eventually flowing through the outlets 118 near the tops of the shields into the annular effluent channels thence through the risers 119 to the effluent trough 121. The settled sediment in the compartments is gradually urged along the top of each tray by the sweeps radially outwardly until it falls over the periphery of each tray. The sediment then falls into the bottom compartment 125 and is discharged therefrom by the pipe 128. Thus the movement of clarifying liquid and sediment is substantially parallel and both move radially outwardly within each settling zone. Hence no counter-currents exist within the settling zones which would be harmful to settling or filtering, as would be apt to occur if the liquid and sediment moved in opposite directions.

Details of construction of the sweep arms are not of importance in this invention and it is of course understood that the shaft 133 may be driven in any desired manner.

The modified form of settler shown in Fig. 5 is illustrated as having four compartments, but like the other forms of settlers herein described may have a greater or lesser number of compartments. In this instance, the cylindrical tank 141 has a top 142 and a bottom 143, and is divided into four settling compartments by the trays 144, 145 and 146. The periphery of each tray is secured in any suitable manner in sealing relation continuously to the inner wall of the tank and each tray including the top cover has a central feed aperture whose margin is formed by an inverted grooved member 147, the groove constituting a continuous channel around each aperture.

A sweep arm drive shaft 148, having a gear 149 by which it may be rotated by any suitable source of motive power, has a plurality of spiders 151 fixed thereon, each spider supporting and carrying an annular feed collar 152. The upper margin of each feed collar extends into the groove of the overlying grooved member 147 and forms therewith a trap through which gases accumulating in each compartment may escape into the central feed channel, thence upwardly to the feed box 153. The traps permit escape of gas but prevent the raw unclarified liquid from entering the central upper portions of the settling compartments.

Supported preferably on the outside of each feed collar is a plurality of sweep arms, such as arms 154, by means of brackets such as 155 and 156. Each arm carries a plurality of staggered blades such as are commonly employed in settlers of this character for gently and progressively urging the settled sediment toward the outer margins of the trays. The construction of such blades is so well known as to require no particular description.

The feed box 153 mounted on top of the tank has an inlet pipe 157 and a scum launder 158. By keeping the liquid level in the feed box high enough any scum present can be caused to overflow into the launder, from which it can be discharged through pipe 159.

Each compartment has a plurality of effluent draw-off pipes 161 located in the upper outer margins thereof substantially as shown. The number of such pipes is variable in accordance with individual desires and in the case of settlers of fifty or more feet in diameter may be quite numerous. Enough of them should be employed to induce a flow of clear effluent in a uniform manner radially outwardly from the central feed apertures.

Likewise, each compartment has in its outer margin near the bottom thereof a plurality of sludge draw-off pipes 162, each, if desired, having a butterfly valve 163 of usual construction, or some other type of valve for regulating the outflow of sludge through the individual pipes. The pipes 162 empty into one or more sludge collecting pipes 164 which will carry the sludge away from the settler.

The clear liquid from each compartment is drawn off through pipes 161 to overflow boxes like box 165, a weir 166 being threaded onto the top of each pipe and being raised or lowered to accelerate or slow down the rate of flow through each compartment. The overflow boxes may discharge through pipe 167 to any suitable place desired.

The settler shown in Fig. 5 operates as follows. The raw unclarified liquid enters the feed box 153 through pipe 157. Flowing downwardly through the central feed channel the liquid enters each compartment passing below the edge of the collar 152. By suitable detention and regulation of the sludge discharge a deep sediment layer is maintained on each tray extending to about the level indicated by dotted lines 160 so that the incoming liquid must enter the interior of each sediment layer and filter outwardly and upwardly therethrough. This filtering action consolidates the fine and coarse sediment particles and greatly assists in producing a clear effluent. Both the sediment and the clarifying effluent move radially outwardly from the center of each compartment to their separate outlets in the peripheral margins of the compartment substantially parallel to each other and without counterflow effects which might set up eddy currents to disturb the settling action.

It should be further understood with regard to all of the forms of settlers herein shown and described that mere details of construction such as would be dictated by good engineering and proper manufacturing methods are not shown in the drawings, being omitted for the sake of simplicity and to facilitate emphasizing the more important features with which the invention is concerned. It likewise should be observed that the advantages and principles of operation of the various forms of settlers herein shown may be made available in other modifications differing considerably from those illustrated in the drawings.

Having shown and described the invention, I claim:

1. In a settler tank having a plurality of superimposed stationary trays dividing the tank into a plurality of settling compartments, central feed openings in the plurality of trays, a rotatable shaft extending vertically through the center of said openings, annular feed collars carried by said shaft for rotation therewith positioned adjacent to and below the margins of said openings, each collar having its lower edge terminating a short distance above the level of an adjacent tray for restraining liquid from entering the comartments between the trays except at the lower central portion of each compartment and means for preventing liquid flow between the junctures of the upper edges of said collars and the central margins of said trays.

2. In a settler having superimposed stationary trays, central feed openings in said trays and annular feed collars provided with means for rotating the same, said collars having their upper and lower edges in proximity to the openings of said trays, means for establishing a seal against the passage of liquid between the margins of said openings and the upper edges of the corresponding adjacent feed collars, and means for supplying liquid for settling into the spaces within said collars before entry into the compartments between the trays.

3. In a settler having a plurality of superimposed stationary settling trays, central feed openings therethrough, annular feed collars mounted for rotation adjacent the margins of said openings, and means providing passages for the escape of gas from beneath each tray over the top of the adjacent collar while preventing a similar flow of liquid.

4. In a settler having a plurality of stationary superimposed trays and central feed openings therethrough, a rotatable shaft extending vertically through said feed openings carrying annular collars positioned with their upper edges in proximity to the openings and each collar having its lower edge terminating a short distance above the level of an adjacent tray, the collars and trays cooperating for restraining a vertically moving column of liquid from entering the compartments formed between the trays excepting underneath the collars at the lower central portion of each compartment.

5. In a settler having a plurality of stationary superimposed trays and central feed openings therethrough, a rotatable shaft extending vertically through said feed openings carrying annular collars positioned in proximity to the openings and each having its lower edge terminating a short distance above the level of an adjacent tray for restraining a vertically moving column of liquid from entering the compartments formed between the trays excepting at the lower central portion of each compartment, and means for controlling the escape of gas from the upper portion of each compartment past the adjacent collar arranged for preventing passage of liquid therethrough.

6. In a settler, a plurality of superimposed stationary trays, each tray having a peripheral apron depending therefrom, a central feed opening in each tray, and rotatable annular collars arranged to restrain liquid from entering the spaces between the trays excepting only at the lower central portions of said spaces.

7. In a settler having a plurality of superimposed stationary trays provided with central feed openings, a downwardly facing grooved member at the margin of each opening, a plurality of annular feed collars mounted for rotation in said openings with the upper edge of each collar extending upwardly into a respectively associated grooved member, thus forming a passage for effectively trapping gas accumulations in said grooved member while permitting the escape of excessive accumulations of gas therethrough.

8. In a settler having a plurality of superimposed stationary trays provided with central feed openings, a downwardly facing grooved member at the margin of each opening, a plurality of annular feed collars mounted for rotation in said openings with the upper edge of each collar extending upwardly into a respectively associated grooved member, thus forming a passage for effectively trapping gas accumulations in said grooved member while permitting the escape of excessive accumulations of gas therethrough, the lower margin of each feed collar terminating a short distance above the level of the subjacent tray.

9. In a settler, a cylindrical tank, a plurality of superimposed trays secured to the wall of the tank perforated only at their centers, a sweep arm drive shaft extending vertically through said centers and carrying annular feed collars rotatable therewith each extending from a position slightly higher than one of the trays up into proximity with the overlying tray, sweep arms supported on said collars for travel over said trays, effluent outlets just below and sediment outlets just above the juncture of each tray and the tank wall, means for supplying liquid for settling into the spaces within said collars before entry into the compartments formed between the trays, the tank wall and the collars, the trays and said collars cooperating to restrain the liquid flow into said compartments excepting only beneath the lower edges of the collars.

10. In a settler, a cylindrical tank, a plurality of trays secured to the tank wall imperforate except at their centers, downwardly opening grooved traps on the margins of the central tray apertures, a drive shaft extending through said apertures carrying annular collars each extending from just above a tray aperture into the groove of the overlying trap, each collar forming with a pair of trays and the tank wall a settling compartment, means for withdrawing clarified effluent from the upper outer margins of the compartments, and means for withdrawing sediment from the outer lower margins of the compartments and regulatable to maintain a sediment layer on each tray extending higher than the lower edge of each associated collar.

11. In a settler, a plurality of superimposed stationary trays each provided with a peripheral depending apron, a central feed opening in each tray, annular collars and means for rotating them, the collars being arranged in conjunction with the trays to restrain liquid from entering the spaces between the trays excepting only beneath the collars into the lower central portions of said spaces, means for supplying liquid to be settled into said central feed openings within the collars before entry into said spaces, annular walls depending from the underside of several of said trays spaced a short distance inwardly from said aprons and provided with openings near their juncture with the trays for permitting the flow of supernatant clarified liquid into channels formed between the aprons and said walls, means for withdrawing clarified liquid from said channels without further contamination by the settled sediments, and sweeps for moving the settling sediments radially outwardly on the tray tops beneath said annular walls and downwardly over said aprons.

12. In a multiple tray settler tank having a plurality of superimposed stationary trays, depending aprons on the peripheral margins of said trays, central feed openings in the trays and feed collars constructed and arranged in cooperation with said tray openings to direct the feed of unclarified liquid into the compartments only beneath the edges of the collars at points just above the top surface of the tray underlying each compartment, annular walls depending from the tray ceiling in each compartment a short distance inwardly from the surrounding apron, there being openings in the upper portions of said walls for admitting clarified effluent from each compartment into the channel formed between each wall and its associated surrounding apron, and means for withdrawing effluent from said channels at spaced apart positions about the settler tank.

EMILY F. GILCHRIST,
*Executrix of the Estate of William A. Gilchrist, Deceased.*